United States Patent [19]
Chamberlain

[11] Patent Number: 5,921,070
[45] Date of Patent: Jul. 13, 1999

[54] CORN HEAD WITH VARIABLE KNIFE AND GATHERING BELT SPEED

[75] Inventor: Neal C. Chamberlain, Hoopeston, Ill.

[73] Assignee: FMC Corporation, Chicago, Ill.

[21] Appl. No.: 08/874,637

[22] Filed: Jun. 13, 1997

[51] Int. Cl.$^6$ .................................................. A01D 45/02
[52] U.S. Cl. ............................ 56/10.2 G; 56/98; 56/106; 56/111
[58] Field of Search .................................. 56/98, 10.2 G, 56/10.2 H, 62, 76, 80, 84, 94, 66, 69, 75, 78, 82, 88, 93, 106, 108, 111, 118, 119

[56] References Cited

U.S. PATENT DOCUMENTS

| | | | |
|---|---|---|---|
| 3,759,021 | 9/1973 | Schreiner et al. | 56/106 |
| 3,831,356 | 8/1974 | Maiste et al. | 56/106 X |
| 4,227,366 | 10/1980 | Pucher | 56/106 X |
| 4,434,606 | 3/1984 | Rhodes et al. | 56/106 |

OTHER PUBLICATIONS

Brochure, "1000C Series Corn Head", ©1993 Byron Enterprises Inc.
Brochure, "Mais Doux, Bourgoin for your Harvest Campaign", Bourgoin, 85110 Chantonnay, France. (Date unknown).

Primary Examiner—Terry Lee Melius
Attorney, Agent, or Firm—Pauley Petersen Kinne & Fejer

[57] ABSTRACT

The invention provides a harvester to harvest crops such as rows of corn. The invention provides independent drives and independent controls for gathering belts, and independent drives and independent controls for knife rolls used on a corn harvester. The independent drives and independent controls allow the speed of the gathering belts or the knife rolls to be varied without affecting other harvester components. The independent speed control between the gathering belts and the knife rolls, allow for better harvesting in various crop conditions. The invention also provides a means for changing the angle of the corn head to allow better harvesting under varying conditions.

11 Claims, 4 Drawing Sheets

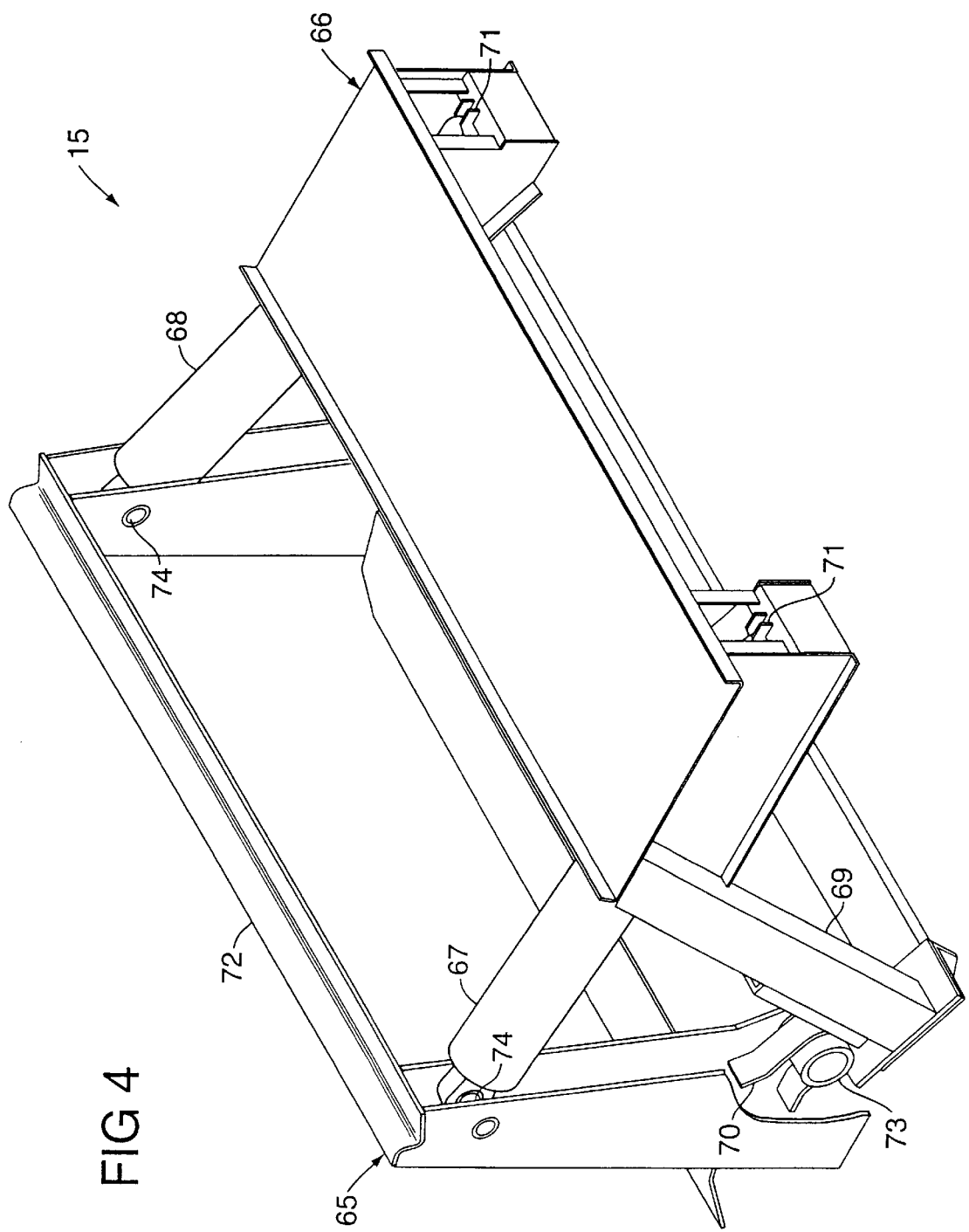

CORN HEAD WITH VARIABLE KNIFE AND GATHERING BELT SPEED

BACKGROUND OF THE INVENTION

The present invention relates generally to a harvester for harvesting crops such as corn.

Conventional harvesters for harvesting crops such as sweet corn, seed corn or field (animal feed, etc.) corn, use corn heads which utilize unit gear system which drives both the knives (or stock rolls) and gathering belts (or chains). These systems used dependent drive systems to drive the knives and the gathering belts. An example of such a system is described in U.S. Pat. No. 4,227,366 incorporated by reference. Older harvesters used independent drive systems to drive the knives and gathering belts, but lacked independent control systems for the knives and gathering belts. Optimizing harvesting parameters using these harvesters is impossible, since many environmental factors influences optimum knife speed and different environmental factors affect optimum gathering belt speed. Optimum knife speed may be affected by crop population, crop height, dryness and insect infestation. Optimum gathering belts speed may be affected by harvester ground speed, which is affected by ground conditions such as terrain, mud, rocks and ditches. The dependent speeds between the knives and the gathering belts prevents independent adjustment of the speeds to match the environment, causing a less efficient operation resulting in reduced yields, damage to the product, reduced cleaning, and reduced machine effectiveness, causing reduced life of the machine and higher maintenance costs.

The optimum gathering belt speed is approximately equal to the ground speed of the harvester. However, ground conditions may dictate a slower ground speed, which would require that the gathering belt speed be slowed down. If the gathering belt speed is not made slower, the gathering belts will aggressively pull corn stalks into the corn head, resulting in higher gathering belt wear. This also causes excessive stalk breakage, which results in an increase in load trash (leaves and stalks).

Another condition in which optimum gathering belt speed may be slower than conventional corn head gathering belt speed occurs when the corn stalks are extremely tall or densely spaced. The harvester must be operated at a slow ground speed to allow the knives and cleaning system to harvest the crop. In this slow ground speed mode, the gathering belt must also be slow to prevent the abrasion and stalk breakage described above.

A third condition in which ground speed may be slower than a conventional gathering belt speed is when the crop is lodged (the stalks are lying down) caused by wind or insects. If the gathering belt speed is higher than ground speed, the gathering belt will break and dislodge the stalks, yielding excess trash in the load.

A fourth condition may occur, which the harvester may travel at a higher speed than normal, such as when the stalks are sparsely populated, the stalks are short, and the ground conditions are good. In this case, the gathering belt speed needs to be faster than the conventional gathering belt speed, to match the ground speed.

SUMMARY OF THE INVENTION

It is an object of the invention to provide a harvester for crops such as corn, which provides independent drives and independent controls between the knives and gathering belts.

It is another object of the invention to provide a corn head with knives and gathering belts, where the speed of the knives may be adjusted without affecting the speed of the gathering belts.

It is another object of the invention to provide a corn head with knives and gathering belts, where the speed of the gathering belts may be adjusted without affecting the speed of the knives.

It is another object of the invention to provide independent speed control between the knives and gathering belts, so that the speed of the gathering belt more closely matches the ground speed of the harvester.

The invention provides drives systems for the knives and gathering belts on a corn head that allow the speed of the knives and gathering belts to be independently adjusted. The invention also provides a means for adjusting the angle of the corn head with respect to the feeder house.

BRIEF DESCRIPTION OF THE DRAWINGS

FIG. 4 is a detailed view of the corn head angle adjuster used in the harvester illustrated in FIG. 1.

DESCRIPTION OF THE PREFERRED EMBODIMENTS

Figure 1:
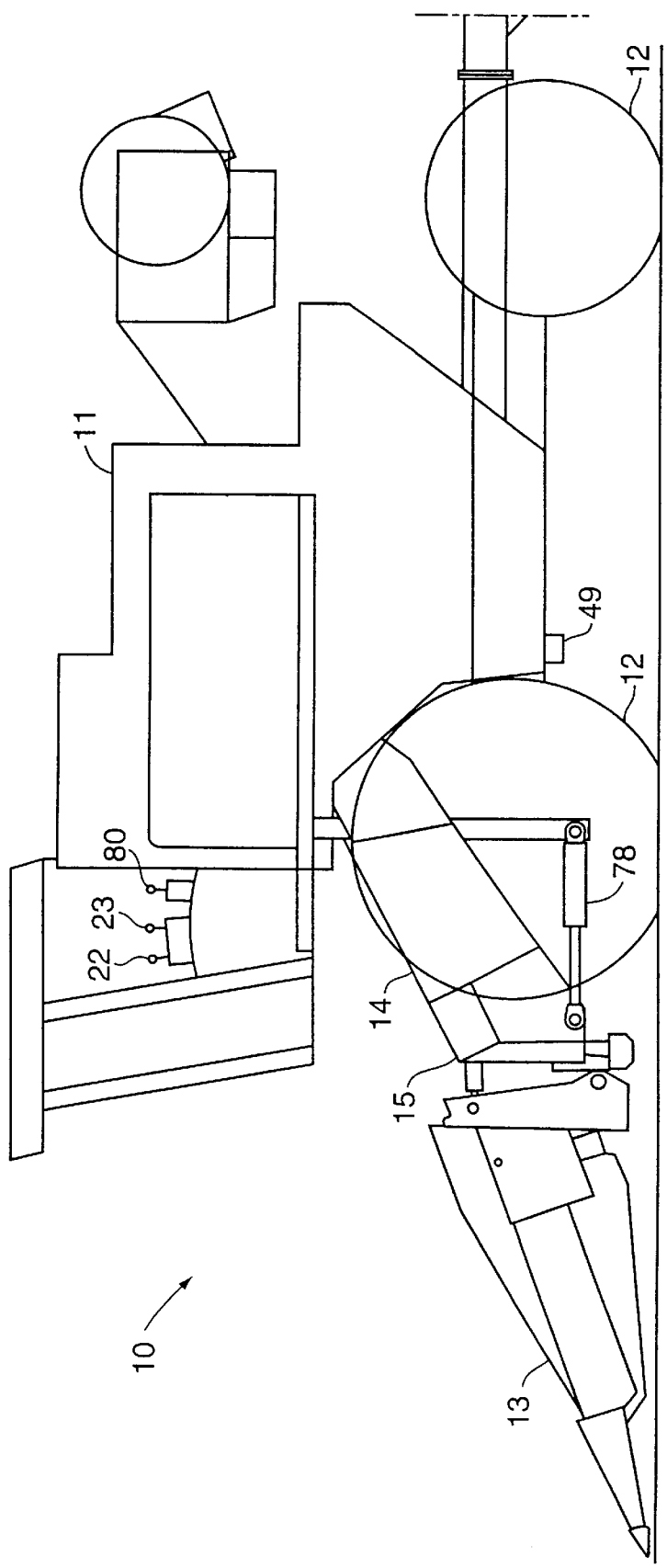
FIG. 1 is a schematic view of a harvester with a head that uses the invention.
Figure 2:
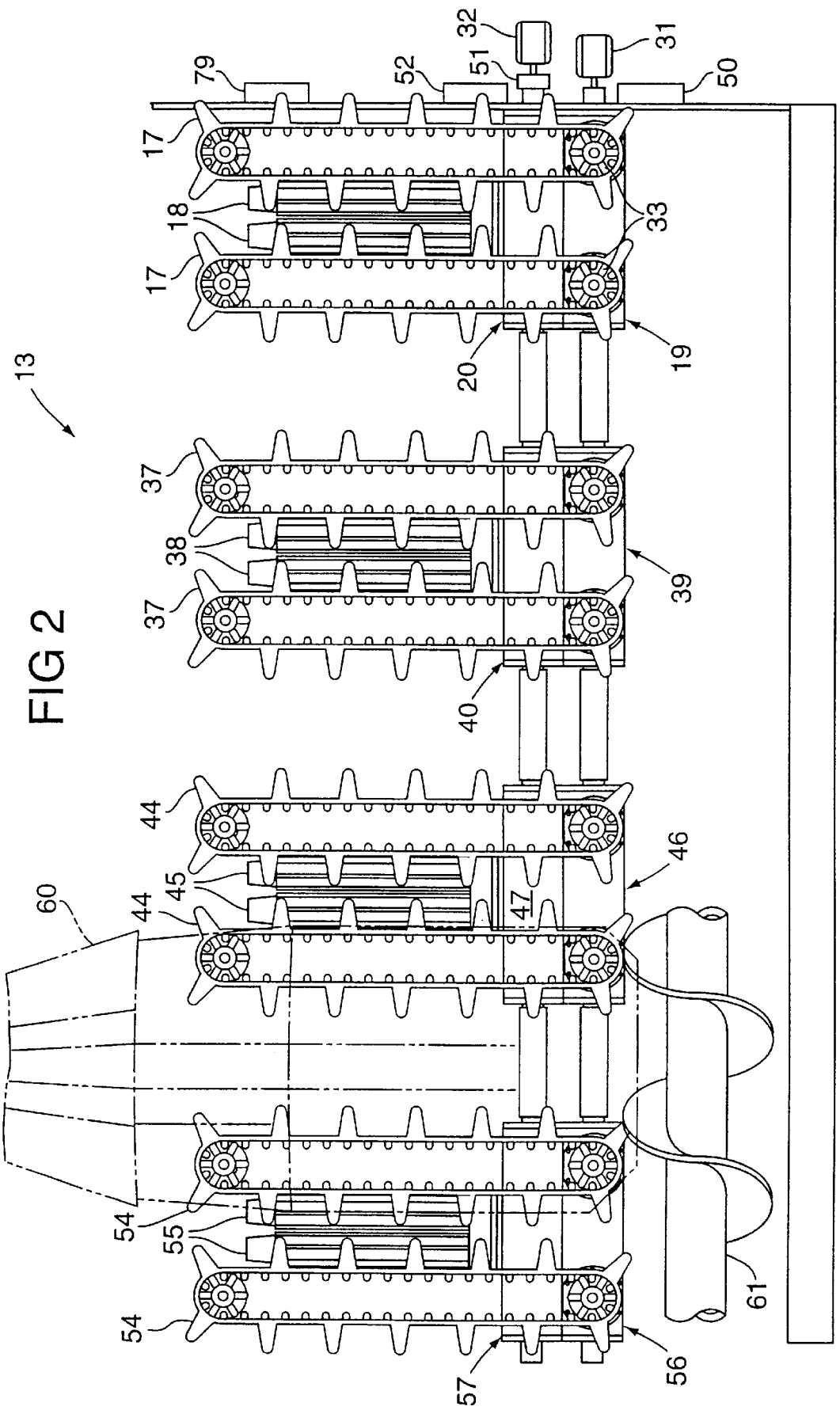
FIG. 2 is cut away plan view of a corn head used in the harvester illustrated in FIG. 1.

FIG. 1 is a schematic view of a harvester 10, which comprises a chassis 11 supported on wheels 12, where the chassis 11 supports a corn head 13 for harvesting corn through a feeder house 14 with a corn head angle adjuster 15 connected between the corn head 13 and the feeder house 14. FIG. 2 is a cut away plan view of the corn head 13.

The corn head 13, which is used to harvest multiple rows at a time, comprises; a first pair of gathering belts 17, a first pair of knife rolls 18; a first gathering belt drive system 19 mechanically connected to the first pair of gathering belts 17; a first knife roll drive system 20 mechanically connected to the first pair of knife rolls 18; a gathering belt speed switch 22 (FIG. 1) connected to a gathering belt speed controller 50, and a knife roll speed switch 23 (FIG. 1) connected to a knife roll speed controller 52.

Figure 3:
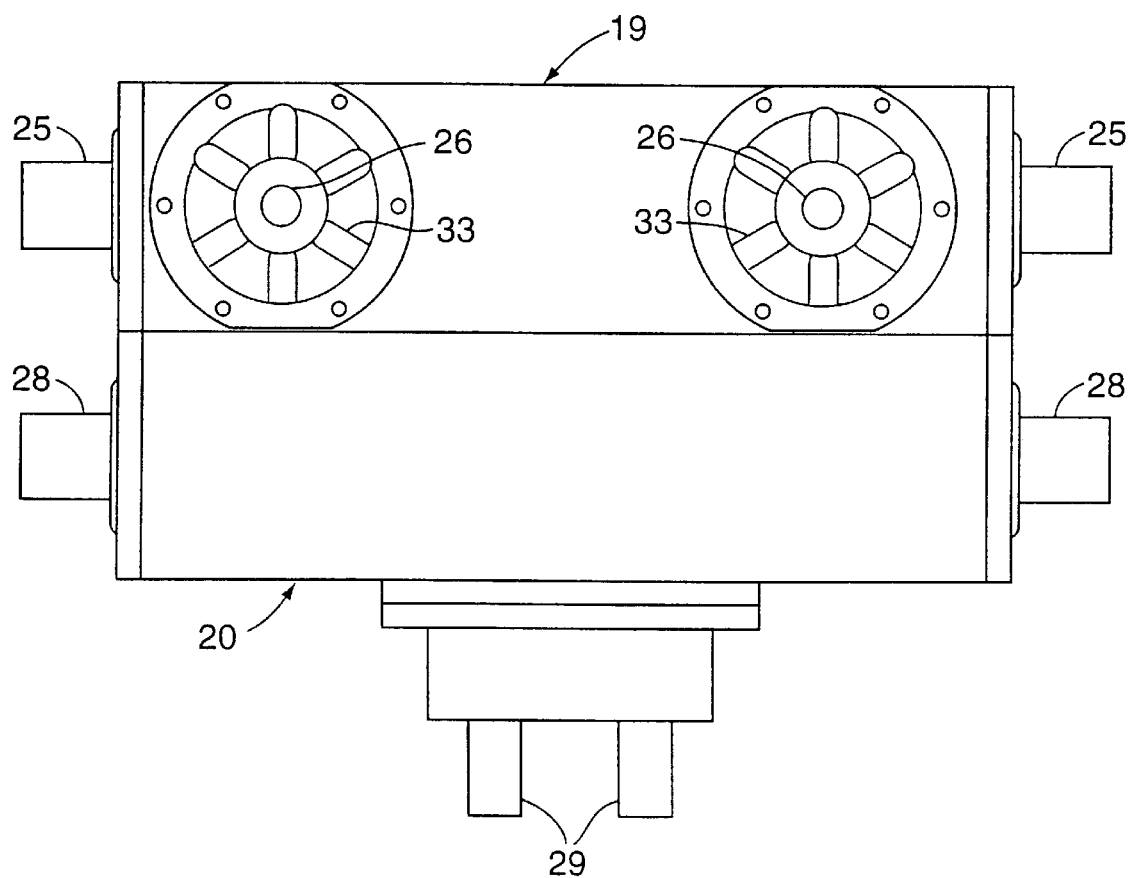
FIG. 3 illustrates drive systems used in the inventive corn head illustrated in FIG. 2.

FIG. 3 is a detailed view of the first gathering belt drive system 19 and the first knife roll drive system 20. The first gathering belt drive system 19, comprises first gathering belt input shafts 25, which are connected to other gathering belt drive systems and first gathering belt output shafts 26 that are mechanically connected to the first pair of gathering belts 17. The first knife roll drive system 20, comprises first knife roll input shafts 28 mechanically connected to other knife roll drive systems and first knife roll output shafts 29 mechanically connected to the first pair of knife rolls 18. The first gathering belt drive system 19 and the first knife roll drive system 20 may be housed in separate housings forming two gear boxes or the same housing forming a single gear box. A first motor 31 is mechanically connected to the first gathering belt input shaft 25. A second motor 32 mechanically connected to a first knife roll input shaft 28, through a torque sensor 51 (FIG. 2). The torque sensor 51 and the first motor 31 are connected either electrically, mechanically, or hydraulically to a knife roll speed controller 52. The gathering belt speed controller 50 controls the speed of the first motor 31. The knife roll speed controller 52 controls the speed of the second motor 32.

A first pair of sprockets 33 are mounted on the first gathering belt output shafts 26. The first pair of gathering belts 17 are mounted on and driven by the first pair of sprockets 33. The first pair of knife rolls 18 are directly connected to the first knife roll output shafts 29.

In this embodiment, the corn head 13, further comprises; a second pair of gathering belts 37, a second pair of knife rolls 38; a second gathering belt drive system 39 mechanically connected to the second pair of gathering belts 37 and the first gathering belt system 19; a second knife roll drive system 40 mechanically connected to the second pair of knife rolls 38 and the first knife roll drive system 20. An input shaft of the second gathering belt drive system 39 is mechanically connected to a first gathering belt input shaft 25. Second gathering belt output shafts are mechanically connected to the second pair of gathering belts 37. An input shaft of the second knife roll drive system 40 is mechanically connected to a first knife roll input shaft 28. The output shafts of the second knife roll drive system 40 are mechanically connected to the second pair of knife rolls 38.

A third pair of gathering belts 44, a third pair of knife rolls 45, a third gathering belt drive system 46, a third knife roll drive system 47, are also shown in this embodiment. The input shaft of the third gathering belt drive system 46 is mechanically connected to the second gathering belt drive system 39. The input shaft of the third knife roll drive system 47 is mechanically connected to the second knife roll drive system 40.

A fourth pair of gathering belts 54, a fourth pair of knife rolls 55, a fourth gathering belt drive system 56, a fourth knife roll drive system 57, are also shown in this embodiment. The input shaft of the fourth gathering belt drive system 56 is mechanically connected to the third gathering belt drive system 46. The input shaft of the fourth knife roll drive system 57 is mechanically connected to the third knife roll drive system 47.

A separator covering 60 is shown to cover a right gathering belt of the fourth pair of gathering belts 54 and a left gathering belt of the third pair of gathering belts 44. Other separator coverings are also provided to similarly cover gathering belts of adjacent pairs of gathering belts. An auger 61 is located at the rear of the gathering belts.

A ground speed sensor 49, FIG. 1, is mounted to the chassis and detects the ground speed of the harvester 10. Both the ground speed sensor 49 and the gathering belt speed switch 23 are connected either electrically or hydraulically to a gathering belt speed controller 50, FIG. 2.

FIG. 4 is a detailed view of the corn head angle adjuster 15. The corn head angle adjuster comprises a corn head bracket 65 for mounting to the corn head 13, a feeder house bracket 66 for mounting to the feeder house 14, and a first adjuster cylinder 67 and a second adjuster cylinder 68 mounted between the feeder house bracket 66 and the corn head bracket 65. The feeder housing bracket 66 comprises a mounting frame 69, a pair of clevises 70, and a pair of hydraulic cylinder mounts 71. The corn head bracket 65 comprises a mounting frame 72, a pair of clevis tubes 73, and a pair of hydraulic cylinder mounts 74. The clevis tubes 73 fit into the clevises 70 to form a pivot about a horizontal axis. In other embodiments, other pivots may be used between the feeder house bracket 66 and the corn head bracket 75. The pivot is preferably on the lower parts of the feeder house bracket 66 and the corn head bracket 75 as shown.

A feeder house hydraulic cylinder 78, FIG. 1, extends from the chassis 11 to the feeder house 14. An angle controller 79, FIG. 2 is connected between an angle switch 80 and the first and second adjusting cylinders 67, 68.

In operation, the harvester 10 is propelled through a corn field by the wheels 12. A row of corn passes between the first pair of gathering belts 17 and the first pair of knife rolls 18. The first pair of gathering belts 17 gather in the corn stalks, and the first pair on knife rolls 18 engage the corn stalks. The gathering belt speed controller 50 receives input from the gathering belt speed switch and the ground speed sensor and controls the speed of the first motor 31, which controls the speed of the first pair of gathering belts 17 and the second pair of gathering belts 37. This allows the speed of the gathering belts to be set either by the operator or according to the ground speed, or by a combination of both. The knife roll speed controller 52 is used to control the second motor 32, which controls the speed of the second motor, which controls the speed of the first pair of knife rolls 18 and the second pair of knife rolls 38. This allows the speed of the knife rolls to be set by either the operator or according to the torque on the knife rolls or by a combination of the both. It is desirable to increase the speed of the knife rolls if the torque increases. This is because, an increase in torque indicates an increase in the corn stalks engaged with the knife rolls. It is desirable to increase the knife roll speed to properly process this increased volume. The independent drive system allows the speed of the gathering belts to be controlled independently of the speed of the knife rolls. The controllers use this independent speed to allow for a more efficient processing of the corn stalks.

The angle switch 80 is set by the operator to specify the desired angle that the first pair of knife rolls 18 are to make with the horizontal, which in this embodiment is an angle between 20° and 30°. The setting of the angle switch 80 is communicated to the angle controller 79, which measures the present angle of the corn head 13 using a sensor such as a level measuring device. If the desired angle is greater than the present angle that the first pair of knife rolls 18 makes with the horizontal then angle controller 79 causes the feeder house hydraulic cylinder 78 to extend, lifting the corn head 13 from the ground, and the first and second adjusting cylinders 67,68 extend to increase the angle that the first pair of knife rolls 18 makes with the horizontal pivoting the corn head 13 around the clevises 70, until the desired angle is reached. If the desired angle is less than the present angle that the first pair of knife rolls 18 makes with the horizontal then the first and second adjusting cylinders 67,68 retract to decrease the angle that the first pair of knife rolls 18 makes with the horizontal, until the desired angle is reached and the feeder house hydraulic cylinder 78 retracts, lowering the corn head 13. Thus by activating the first and second adjusting cylinders 67, 68 in combination with the feeder house hydraulic cylinder 78, a harvester with a corn head is provided, which may harvest at various angles, thereby optimizing the harvesting function in changing field conditions. If the operator lowers the corn head 13 close to the ground, the movement of the feeder house 14 causes the angle of the corn head 13 to change. The angle controller 79 changes the angle of the corn head 13, so that the desired angle of the corn head 13 is achieved near the ground. If the operator raises the corn head 13, the movement of the feeder house 14 causes the angle of the corn head 13 to change. The angle controller 79 changes the angle of the corn head 13, so that the desired angle of the corn head 13 is achieved at a distance above the ground.

As used in the specification and claims means for mechanically connecting may be by screws, bolts, clutch mechanisms or drive shafts.

Other embodiments of the invention may provide other gearbox or controller configurations to provide the independent speed control between knife rolls and gathering belts. Other embodiments may use other power means in place of the first and second adjusting cylinders, to rotate the corn head around the pivot provided by the clevises. Other power means may also be used in place of the feeder house hydraulic cylinder for raising and lowering the feeder house. The invention may also be provided as a kit to existing harvesters.

While preferred embodiments of the present invention have been shown and described herein, it will be appreciated that various changes and modifications may be made therein without departing from the spirit of the invention as defined by the scope of the appended claims.

What is claimed is:

1. A harvester for harvesting rows of corn, comprising:
    a chassis;
    a plurality of wheels mechanically connected to the chassis, supporting the chassis; and
    a corn harvesting head, mechanically connected to the chassis and supported by the chassis, comprising:
        a harvesting head frame;
        a first pair of gathering belts supported by the harvesting head frame;
        a first gathering belt drive system supported by the harvesting head frame and mechanically connected to the first pair of gathering belts;
        a first motor, supported by the harvesting head frame and mechanically connected to the first gathering belt drive system;
        a gathering belt speed controller connected to the first motor;
        a first pair of knife rolls spaced below the first pair of gathering belts for engaging a row of corn stalks passing between the first pair of gathering belts;
        a first knife roll drive system supported by the harvesting head frame and mechanically connected to the first pair of knife rolls;
        a second motor, supported by the harvesting head frame and mechanically connected to the first knife roll drive system; and
        a knife roll speed controller connected to the second motor.

2. The harvester, as claimed in claim 1, wherein the first gathering belt drive system, comprises:
    a first input shaft, mechanically connected to the first motor; and
    a plurality of output shafts mechanically connected to the first pair of gathering belts, and wherein the first knife roll drive system, comprises:
    a first input shaft, mechanically connected to the second motor; and
    a plurality of output shafts mechanically connected to the first pair of knife rolls.

3. The harvester, as claimed in claim 2, wherein the corn harvesting head, further comprises:
    a second pair of gathering belts supported by the harvesting head frame;
    a second gathering belt drive system supported by the harvesting head frame and mechanically connected to the second pair of gathering belts and the first gathering belt drive system;
    a second pair of knife rolls spaced below the second pair of gathering belts for engaging a row of corn stalks causing the stalks to pass between the second pair of gathering belts;
    a second knife roll drive system supported by the harvesting head frame and mechanically connected to the second pair of knife rolls and the first knife roll drive system.

4. The harvester, as claimed in claim 3, wherein the first gathering belt drive system, comprises:
    a first input shaft, mechanically connected to the first motor; and
    a plurality of output shafts mechanically connected to the first pair of gathering belts, and wherein the first knife roll drive system, comprises:
    a first input shaft, mechanically connected to the second motor; and
    a plurality of output shafts mechanically connected to the first pair of knife rolls.

5. The harvester, as claimed in claim 4, wherein the second gathering belt drive system, comprises:
    a first input shaft, mechanically connected to the first gathering belt drive system; and
    a plurality of output shafts mechanically connected to the second pair of gathering belts, and wherein the second knife roll drive system, comprises:
    a first input shaft, mechanically connected to the first knife roll drive system; and
    a plurality of output shafts mechanically connected to the second pair of knife rolls.

6. The harvester, as claimed in claim 5, further comprising a ground speed sensor, connected to the gathering belt speed controller.

7. The harvester, as claimed in claim 6, further comprising a torque sensor mechanically connected between the first input shaft of the knife roll drive system and the second motor, and connected to the knife roll speed controller.

8. The harvester, as claimed in claim 7, wherein the knife roll speed controller, increases the speed of the first knife roll drive system, when the torque sensor senses an increase in torque.

9. The harvester, as claimed in claim 1, further comprising a ground speed sensor, connected to the gathering belt speed controller.

10. The harvester, as claimed in claim 9, further comprising a torque sensor mechanically connected between the first input shaft of the knife roll drive system and the second motor, and connected to the knife roll speed controller.

11. The harvester, as claimed in claim 10, wherein the knife roll speed controller, increases the speed of the first knife roll drive system, when the torque sensor senses an increase in torque.

* * * * *